United States Patent
Yan

(10) Patent No.: US 11,468,048 B2
(45) Date of Patent: *Oct. 11, 2022

(54) ASSET MANAGEMENT METHOD AND APPARATUS, AND ELECTRONIC DEVICE

(71) Applicant: Advanced New Technologies Co., Ltd., Grand Cayman (KY)

(72) Inventor: Xuebing Yan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/355,009

(22) Filed: Jun. 22, 2021

(65) Prior Publication Data

US 2021/0319012 A1 Oct. 14, 2021

Related U.S. Application Data

(63) Continuation of application No. 16/724,642, filed on Dec. 23, 2019, now Pat. No. 11,144,540, which is a (Continued)

(30) Foreign Application Priority Data

Feb. 14, 2018 (CN) .......................... 201810151607.8

(51) Int. Cl.
*G06F 16/23* (2019.01)
*G06F 16/27* (2019.01)
(Continued)

(52) U.S. Cl.
CPC .......... *G06F 16/2379* (2019.01); *G06F 16/27* (2019.01); *H04L 9/0637* (2013.01); *H04L 9/50* (2022.05)

(58) Field of Classification Search
CPC ... G06F 16/2379; G06F 16/27; H04L 9/0637; H04L 2209/38; H04L 2209/56; H04L 9/3239; H04L 9/50; G06Q 40/04
See application file for complete search history.

(56) References Cited

U.S. PATENT DOCUMENTS

| 8,832,059 B2 | 9/2014 | Baran |
| 9,342,697 B1 | 5/2016 | Ren et al. |

(Continued)

FOREIGN PATENT DOCUMENTS

| CA | 3015569 | 8/2017 |
| CN | 105956923 | 9/2016 |

(Continued)

OTHER PUBLICATIONS

Alvarez-Diaz et al., "Smart Contracts based on blockchain for logistice management", 99. Proceedings of the 1st International Conference on Internet of Things and Machine Learning, 8 pages, 2017.

(Continued)

*Primary Examiner* — Robert W Beausoliel, Jr.
*Assistant Examiner* — Mohammad S Bhuyan
(74) *Attorney, Agent, or Firm* — Fish & Richardson P.C.

(57) ABSTRACT

This specification describes techniques for managing assets in a blockchain. One example method includes receiving, from a target user recorded in a distributed database of the blockchain network, a user input including a request to generate an asset object in the blockchain network, the blockchain network including an account object and a contract object, determining, based on the user input, an asset type of the asset object, initiating, in the blockchain network, the contract object corresponding to generate the asset object based on the asset type, the asset object including a digital asset corresponding to a physical asset associated with the target user, assigning the asset object to a target object of the target user, and adding address information of the asset object to the target object.

17 Claims, 6 Drawing Sheets

Related U.S. Application Data continuation of application No. 16/275,403, filed on Feb. 14, 2019, now Pat. No. 11,055,279.

(51) Int. Cl.
  *H04L 9/06* (2006.01)
  *H04L 9/00* (2022.01)
  *H04L 9/32* (2006.01)
  *G06Q 40/04* (2012.01)

(56) References Cited

U.S. PATENT DOCUMENTS

| | | | |
|---|---|---|---|
| 9,870,508 B1* | 1/2018 | Hodgson | G11B 27/10 |
| 9,992,022 B1* | 6/2018 | Chapman | G06F 21/604 |
| 10,102,082 B2 | 10/2018 | Cabrera et al. | |
| 10,204,349 B2 | 2/2019 | McCauley et al. | |
| 10,564,820 B1 | 2/2020 | Cabanero et al. | |
| 2002/0109737 A1 | 8/2002 | Jaeger | |
| 2003/0233370 A1 | 12/2003 | Barabas et al. | |
| 2007/0198432 A1* | 8/2007 | Pitroda | G06Q 20/42 |
| | | | 705/64 |
| 2008/0320024 A1 | 12/2008 | Thirumalai et al. | |
| 2014/0067650 A1 | 3/2014 | Gardiner et al. | |
| 2014/0279942 A1 | 9/2014 | Siepmann et al. | |
| 2015/0244690 A1 | 8/2015 | Mossbarger | |
| 2015/0262176 A1 | 9/2015 | Langschaedel et al. | |
| 2015/0379510 A1 | 12/2015 | Smith | |
| 2016/0012424 A1 | 1/2016 | Simon et al. | |
| 2016/0151715 A1 | 6/2016 | Polansky et al. | |
| 2016/0196324 A1 | 7/2016 | Haviv et al. | |
| 2016/0283920 A1 | 9/2016 | Fisher et al. | |
| 2016/0292672 A1 | 10/2016 | Fay et al. | |
| 2017/0005804 A1* | 1/2017 | Zinder | G06F 21/6254 |
| 2017/0033932 A1 | 2/2017 | Truu et al. | |
| 2017/0046792 A1* | 2/2017 | Haldenby | G06F 21/62 |
| 2017/0048209 A1 | 2/2017 | Lohe et al. | |
| 2017/0048235 A1 | 2/2017 | Lohe et al. | |
| 2017/0076306 A1* | 3/2017 | Snider | H04W 4/029 |
| 2017/0103468 A1 | 4/2017 | Orsini et al. | |
| 2017/0116693 A1 | 4/2017 | Rae et al. | |
| 2017/0132630 A1 | 5/2017 | Castinado et al. | |
| 2017/0140408 A1 | 5/2017 | Wuehler | |
| 2017/0161733 A1 | 6/2017 | Koletsky et al. | |
| 2017/0221052 A1 | 8/2017 | Sheng et al. | |
| 2017/0232300 A1 | 8/2017 | Tran et al. | |
| 2017/0243208 A1 | 8/2017 | Kurian et al. | |
| 2017/0286880 A1 | 10/2017 | Wiig et al. | |
| 2017/0315882 A1 | 11/2017 | Yammine et al. | |
| 2017/0344987 A1 | 11/2017 | Davis et al. | |
| 2017/0353309 A1 | 12/2017 | Gray | |
| 2018/0005186 A1 | 1/2018 | Hunn | |
| 2018/0018723 A1 | 1/2018 | Nagla et al. | |
| 2018/0025435 A1 | 1/2018 | Karame et al. | |
| 2018/0075527 A1 | 3/2018 | Nagla et al. | |
| 2018/0089183 A1 | 3/2018 | Schwartz et al. | |
| 2018/0089256 A1 | 3/2018 | Wright, Sr. | |
| 2018/0089761 A1 | 3/2018 | Stradling et al. | |
| 2018/0091514 A1 | 3/2018 | Schwartz et al. | |
| 2018/0097841 A1* | 4/2018 | Stolarz | H04L 63/1441 |
| 2018/0101906 A1* | 4/2018 | McDonald | G06Q 20/204 |
| 2018/0167198 A1 | 6/2018 | Muller et al. | |
| 2018/0218176 A1* | 8/2018 | Voorhees | H04L 9/3213 |
| 2018/0218343 A1 | 8/2018 | Kolb | |
| 2018/0253702 A1 | 9/2018 | Dowding | |
| 2018/0309567 A1 | 10/2018 | Wooden | |
| 2018/0329693 A1 | 11/2018 | Eksten et al. | |
| 2018/0330342 A1 | 11/2018 | Prakash et al. | |
| 2019/0013948 A1 | 1/2019 | Mercuri et al. | |
| 2019/0014111 A1* | 1/2019 | Votaw | G06Q 20/12 |
| 2019/0026821 A1 | 1/2019 | Bathen et al. | |
| 2019/0036906 A1 | 1/2019 | Biyani et al. | |
| 2019/0080402 A1 | 3/2019 | Molinari et al. | |
| 2019/0122155 A1 | 4/2019 | Irazabal et al. | |
| 2019/0130484 A1 | 5/2019 | De Jong | |
| 2019/0147431 A1 | 5/2019 | Galebach et al. | |
| 2019/0164153 A1 | 5/2019 | Agrawal et al. | |
| 2019/0172298 A1 | 6/2019 | Just | |
| 2019/0180276 A1* | 6/2019 | Lee | H04L 63/10 |
| 2019/0188706 A1 | 6/2019 | McCurtis | |
| 2019/0222567 A1 | 7/2019 | Caldera et al. | |
| 2019/0228386 A1 | 7/2019 | Onnainty | |
| 2019/0236598 A1 | 8/2019 | Padmanabhan | |
| 2019/0236606 A1 | 8/2019 | Padmanabhan et al. | |
| 2019/0238316 A1 | 8/2019 | Padmanabhan | |
| 2019/0238525 A1 | 8/2019 | Padmanabhan et al. | |
| 2019/0251075 A1 | 8/2019 | Yan | |
| 2019/0251076 A1 | 8/2019 | Yan | |
| 2019/0251078 A1 | 8/2019 | Yan | |
| 2019/0251079 A1 | 8/2019 | Yan | |
| 2019/0251563 A1 | 8/2019 | Yan | |
| 2019/0253257 A1 | 8/2019 | Yan | |
| 2019/0268147 A1 | 8/2019 | Baird | |
| 2019/0289019 A1* | 9/2019 | Thekadath | H04L 9/3239 |
| 2019/0303579 A1 | 10/2019 | Reddy et al. | |
| 2019/0377806 A1 | 12/2019 | Padmanabhan et al. | |
| 2020/0034127 A1 | 1/2020 | Burrowes et al. | |
| 2020/0037158 A1 | 1/2020 | Soundararajan et al. | |
| 2020/0051176 A1 | 2/2020 | Liu et al. | |
| 2020/0125557 A1 | 4/2020 | Yan | |
| 2021/0097795 A1* | 4/2021 | Manchovski | G07C 9/00309 |

FOREIGN PATENT DOCUMENTS

| | | |
|---|---|---|
| CN | 105976231 | 9/2016 |
| CN | 106656974 | 5/2017 |
| CN | 106815764 | 6/2017 |
| CN | 106845960 | 6/2017 |
| CN | 106874087 | 6/2017 |
| CN | 106960388 | 7/2017 |
| CN | 107145768 | 9/2017 |
| CN | 107220820 | 9/2017 |
| CN | 107239940 | 10/2017 |
| CN | 107273759 | 10/2017 |
| CN | 107301536 | 10/2017 |
| CN | 107615317 | 1/2018 |
| CN | 107679857 | 2/2018 |
| KR | 101751025 B1 | 6/2017 |
| KR | 20170123290 | 11/2017 |
| TW | M543413 | 6/2017 |
| TW | 201732666 | 9/2017 |
| TW | 201732705 | 9/2017 |
| TW | 201732706 | 9/2017 |
| TW | 201741955 | 12/2017 |
| TW | 201800997 | 1/2018 |
| TW | M555500 | 2/2018 |
| WO | 2017092788 A1 | 6/2017 |
| WO | WO 2017091530 | 6/2017 |
| WO | WO 2017112664 | 6/2017 |
| WO | WO 2017190175 | 11/2017 |
| WO | WO 2017223470 | 12/2017 |

OTHER PUBLICATIONS binance.vision [online], "Proof of Burn Explained", Binance Academy, 2017, retrieved on Feb. 23, 2020, retrieved from URL <https://www.binance.vision/ja/blockchain/proof-of-burn-explained>, 7 pages (with partial English translation).

Chen et al., "Blockchain-based Payment Collection Supervision System using Pervasive Bitcoin Digital Wallet," Fifth International Workshop on Pervasive and Contect—Aware Middleware, Oct. 2017, 8 pages.

Crosby et al., "BlockChain Technology: Bevond Bitcoin," Sutardja Center for Entrepreneurship & Technology Technical Report, Oct. 16, 2015, 35 pages.

Eips.ethereum.org, [online] "EIP-20: ERC-20 Token Standard," Nov. 2015, retrieved on Apr. 6, 2021, retrieved from URL<https://eips.ethereum.org/EIPS/eip-20>, 5 pages.

Eips.ethereum.org, [online] "EIP-721: ERC-721 Non-Fungible Token Standard," January 2018, retrieved on Apr. 6, 2021, retrieved from URL<https://eips.ethereum.org/EIPS/eip-721>, 14 pages.

Nakamoto, "Bitcoin: A Peer-to-Peer Electronic Cash System," www.bitcoin.org, 2005, 9 pages.

(56) References Cited

OTHER PUBLICATIONS

PCT International Preliminary Report on Patentability in International Application No. PCT/US2019/017946, dated Aug. 18, 2020, 9 pages.
PCT International Search Report and Written Opinion in International Application No. PCT/US2019/017946, dated May 7, 2019, 11 pages.
PCT International Search Report and Written Opinion in International Application No. PCT/US2019/017951, dated May 14, 2019, 7 pages.
PCT International Search Report and Written Opinion in International Application No. PCT/US2019/017956, dated May 14, 2019, 7 pages.
PCT International Search Report and Written Opinion in International Application No. PCT/US2019/017958, dated May 1, 2019, 8 pages.
PCT International Search Report and Written Opinion in International Application No. PCT/US2019/017980, dated May 2, 2019, 9 pages.
PCT International Search Report and Written Opinion in International Application No. PCT/US2019/017986, dated May 1, 2019, 9 pages.
Preethikasireddy.com. [online] "How does Ethereum work, anyway?" Sep. 2017. retrieved on Apr. 6, 2021, retrieved from URL<https://www.preethikasireddy.com/post/how-does-ethereum-work-anyway#Story>, 44 pages.
Buterin., "A Next-Generation Smart Contract and Decentralized Application Platform," Feb. 2018 as per Wayback Machine, Ethereum White Paper, retreived on Jul. 7, 2021, retrieved from URL< https://web.archive.org/web/20180213051349/https:/github.com/ethereum/wiki/wiki/White-Paper>.
Dannen et al., "Introducing Ethereum and Solidity: Foundations of Cryptocurrency and Blockchain Programming for Beginners," ISBN-13 (pbk): 978-1-4842-2534-9 APRESS, Jan. 1, 2017, pp. 7-12, 24-30, 92-127.
Dete, "ERC: Non-fungible Token Standard," Jan. 2018 as per Wayback Machine, retrieved on Jul. 7, 2021, retrieved from URL<https://web.archive.org/web/20180108074602/https://github.com/ethereum/eips/issues/721>.
spri.kr [online], "Blockchain Technology: Prospect and Implications in Perspective of Industry and Society," Sep. 22, 2017, retrieved from URL <https://spri.kr/posts/view/21876?code=issue_reports&page=5>, 52 pages (English Abstract included).
Dickerson et al., "Adding Concurrency to Smart Contracts," PODC '17: Proceedings of the ACM Symposium on Principles of Distributed Computing, Jul. 2017, 303-331.
patents.google.com [online], "(confidentiality same blockchain) and (transfer near request) and (add delete near wallet key)", retrieved on May 25, 2020, retrieved from URL <https://patents.google.com/?q=(confidentiality+same+-blockchain)+(transfer+near+request)+(add+delete+near+wallet+key)&oq=(confidentiality+same+blockchain)+and+(transfer+near+request)+and+(add+delete+near+wallet+key)>.
Narayanan et al., Bitcoin and Cryptocurrency Technologies, Princeton University Press, 2016, 478 pages.

* cited by examiner

ASSET MANAGEMENT METHOD AND APPARATUS, AND ELECTRONIC DEVICE

CROSS-REFERENCE TO RELATED APPLICATIONS

This application is a continuation application of U.S. application Ser. No. 16/724,642, filed Dec. 23, 2019, which is a continuation application of U.S. application Ser. No. 16/275,403, filed on Feb. 14, 2019, and claims priority to Chinese Patent Application No. 201810151607.8, filed on Feb. 14, 2018, each of which is hereby incorporated by reference in its entirety.

TECHNICAL FIELD

One or more implementations of the present specification relate to the field of blockchain network technologies, and in particular, to an asset management method and apparatus, and an electronic device.

BACKGROUND

A blockchain network technology is an emerging technology in which several computing devices jointly participate in "accounting" and jointly maintain a complete distributed database. The blockchain network technology has features of decentralization, openness, and transparency, and a feature that each computing device can participate in database recording, and data synchronization can be quickly performed between computing devices. A method in which a decentralization system is established by using the blockchain network technology and various execution programs are recorded in a distributed database of the blockchain network for automatic execution has been widely applied to many fields. For example, in the field of financial technology, a P2P payment platform is established by using the blockchain network technology and an execution program such as a smart contract is deployed in the blockchain network. Therefore, point-to-point security payment between different users can be implemented without support from a financial institution such as a bank.

SUMMARY

The present specification provides an asset management method, and the method includes: receiving, by a network node of a blockchain network, an asset object creation request; in response to the asset object creation request, invoking a smart contract object that is deployed in the blockchain network and that corresponds to an asset type of an asset object to create the asset object; and adding address information of the created asset object to a target object that holds the asset object.

Optionally, an execution program used to create the asset object is stated in the smart contract object; and the invoking a smart contract object that is deployed in the blockchain network and that corresponds to an asset type of an asset object to create the asset object includes: invoking an execution program stated in a smart contract object that is deployed by a target member (user) of the blockchain network in the blockchain network and that corresponds to the asset type of the asset object to create the asset object.

Optionally, an object supported by the blockchain network includes an address field, and the address field is used to maintain address information of an asset object held by the object.

Optionally, the adding address information of the created asset object to a target object that holds the asset object includes: adding the address information of the created asset object to the address field of the target object that holds the asset object.

Optionally, an object supported by the blockchain network further includes a code field, and the code field is used to maintain execution code related to an execution program stated in the object.

Optionally, the target object that holds the asset object includes: a target object that is specified by a user and that is used to hold the asset object; or a target object that is stated in the smart contract object and that is used to hold the asset object.

Optionally, objects supported by the blockchain network include an account object, a smart contract object, and an asset object; and the target object that holds the asset object includes any one of the account object, the smart contract object, and the asset object.

Optionally, the blockchain network is a consortium chain, and a target member in the blockchain network is a consortium member that has asset object creation authority in the consortium chain.

The present specification further provides an asset management method, and the method includes: receiving, by a network node in a blockchain network, an asset object transfer request initiated by a target user, where the asset object transfer request includes to-be-transferred target asset objects; and in response to the asset object transfer request, removing address information of the target asset object from a target object that holds the target asset object, and adding the address information of the target asset object to an asset receiving object that corresponds to the target asset object.

Optionally, a smart contract object that corresponds to an asset type of the target asset object is deployed in the blockchain network, an execution program used to transfer an asset object is stated in the smart contract object, and the target asset object is created by invoking the smart contract object; and the removing address information of the target asset object from a target object that holds the target asset object, and adding the address information of the target asset object to an asset receiving object that corresponds to the target asset object includes: invoking the execution program stated in the smart contract object that is deployed in the blockchain network and that corresponds to the asset type of the target asset object, and determining whether an asset transferring request satisfies a predetermined transfer rule; and if the asset transferring request satisfies the predetermined transfer rule, removing the address information of the target asset object from the target object that holds the target asset object, and adding the address information of the target asset object to the asset receiving object that corresponds to the target asset object.

Optionally, an object supported by the blockchain network includes an address field, and the address field is used to maintain address information of an asset object held by the object.

Optionally, the removing address information of the target asset object from a target object that holds the target asset object, and adding the address information of the target asset object to an asset receiving object that corresponds to the target asset object includes: removing the address information of the target asset object from the address field in the target object that holds the target asset object, and adding the address information of the target asset object to the address field in the asset receiving object that corresponds to the target asset object.

Optionally, an object supported by the blockchain network further includes a code field, and the code field is used to maintain execution code related to an execution program stated in the object.

Optionally, the asset receiving object that corresponds to the target asset object includes: an asset receiving object that is specified by a user and that corresponds to the target asset object; or an asset receiving object that is stated in the smart contract object corresponding to the asset type of the target asset object and that corresponds to the target asset object.

Optionally, objects supported by the blockchain network include an account object, a smart contract object, and an asset object; and the asset receiving object that corresponds to the target asset object includes any one of the account object, the smart contract object, and the asset object.

The present specification provides an asset management apparatus, and the apparatus includes: a first receiving module, configured to receive an asset object creation request; a creation module, configured to: in response to the asset object creation request, invoke a smart contract object that is deployed in the blockchain network and that corresponds to an asset type of an asset object to create the asset object; and an adding module, configured to add address information of the created asset object to a target object that holds the asset object.

Optionally, an execution program used to create the asset object is stated in the smart contract object; and the creation module is configured to: invoke an execution program stated in a smart contract object that is deployed by a target member of the blockchain network in the blockchain network and that corresponds to the asset type of the asset object to create the asset object.

Optionally, an object supported by the blockchain network includes an address field, and the address field is used to maintain address information of an asset object held by the object.

Optionally, the adding module is further configured to: add the address information of the created asset object to the address field of the target object that holds the asset object.

Optionally, an object supported by the blockchain network further includes a code field, and the code field is used to maintain execution code related to an execution program stated in the object.

Optionally, the target object that holds the asset object includes: a target object that is specified by a user and that is used to hold the asset object; or a target object that is stated in the smart contract object and that is used to hold the asset object.

Optionally, objects supported by the blockchain network include an account object, a smart contract object, and an asset object; and the target object that holds the asset object includes any one of the account object, the smart contract object, and the asset object.

The present specification further provides an asset management apparatus, and the apparatus includes: a second receiving module, configured to receive an asset object transfer request initiated by a target user, where the asset object transfer request includes to-be-transferred target asset objects; and a transferring module, configured to: in response to the asset object transfer request, remove address information of the target asset object from a target object that holds the target asset object, and add the address information of the target asset object to an asset receiving object that corresponds to the target asset object.

Optionally, a smart contract object that corresponds to an asset type of the target asset object is deployed in the blockchain network, an execution program used to transfer an asset object is stated in the smart contract object, and the target asset object is created by invoking the smart contract object; and the transferring module is further configured to: invoke the execution program stated in the smart contract object that is deployed in the blockchain network and that corresponds to the asset type of the target asset object, and determine whether an asset transferring request satisfies a predetermined transfer rule; and if the asset transferring request satisfies the predetermined transfer rule, remove the address information of the target asset object from the target object that holds the target asset object, and add the address information of the target asset object to the asset receiving object that corresponds to the target asset object.

Optionally, an object supported by the blockchain network includes an address field, and the address field is used to maintain address information of an asset object held by the object.

Optionally, the transferring module is further configured to: remove the address information of the target asset object from the address field in the target object that holds the target asset object, and add the address information of the target asset object to the address field in the asset receiving object that corresponds to the target asset object.

Optionally, an object supported by the blockchain network further includes a code field, and the code field is used to maintain execution code related to an execution program stated in the object.

Optionally, the asset receiving object that corresponds to the target asset object includes: an asset receiving object that is specified by a user and that corresponds to the target asset object; or an asset receiving object that is stated in the smart contract object corresponding to the asset type of the target asset object and that corresponds to the target asset object.

Optionally, objects supported by the blockchain network include an account object, a smart contract object, and an asset object; and the asset receiving object that corresponds to the target asset object includes any one of the account object, the smart contract object, and the asset object.

The present specification further provides an electronic device, and the electronic device includes: a processor; and a memory, configured to store a machine-executable instruction, where by reading and executing the machine-executable instruction that is stored in the memory and that corresponds to control logic of blockchain network-based asset management, the processor is enabled to: receive an asset object creation request; in response to the asset object creation request, invoke a smart contract object that is deployed in the blockchain network and that corresponds to an asset type of an asset object to create the asset object; and add address information of the created asset object to a target object that holds the asset object.

The present specification further provides an electronic device, and the electronic device includes: a processor; and a memory, configured to store a machine-executable instruction, where by reading and executing the machine-executable instruction that is stored in the memory and that corresponds to control logic of blockchain network-based asset management, the processor is enabled to: receive an asset object transfer request initiated by a target user, where the asset object transfer request includes to-be-transferred target asset objects; and in response to the asset object transfer request, invoke a smart contract object that is deployed in the blockchain network and that corresponds to an asset type of a target asset object, remove address information of the target asset object from a target object that holds the target asset object, and add the address information of the target asset object to an asset receiving object that corresponds to the target asset object.

In the previous implementations, the target member in the blockchain network can deploy, in the blockchain network, the smart contract object that corresponds to the asset type of the asset object, and the user who accesses the blockchain network can invoke, by initiating the asset object creation request and the asset object transfer request to the blockchain network, the smart contract object that has been deployed in the blockchain network, to complete creation of the asset object in the blockchain network; and can add the address information of the created asset object to the specific target object to hold the asset object, and complete transferring, in the blockchain network, the assets of the held asset object to another asset receiving object. As such, assets in the real world can be converted into digital assets in the blockchain network for holding and complete online asset transference relying on the blockchain network.

DESCRIPTION OF IMPLEMENTATIONS

The present specification is intended to disclose a technical solution to complete creation of an asset object and transference of the asset object in a distributed ledger system, such as a blockchain network.

During implementation, a target member in the blockchain network can deploy, in the blockchain network, a contract object (smart contract) that corresponds to an asset type of the asset object in advance. The created smart contract object is used to manage the asset object, and a user who accesses the blockchain network can create an asset object in the blockchain network by invoking the smart contract object, and complete online management of the held asset object in the blockchain network.

On one hand, in response to creating the asset object, the user who accesses the blockchain network can initiate an asset object creation request to the blockchain network to invoke the smart contract object to complete creation of the asset object, and then add address information of the created asset object to a target object that holds the asset object. For example, an execution program used to create the asset object can be previously stated in the smart contract object, and in this case, the execution program used to create the asset object can be invoked to complete the creation of the asset object.

On the other hand, in response to transferring a held target asset object, the user who accesses the blockchain network can initiate an asset object transfer request to the blockchain network, remove address information of the target asset object from a target object that holds the target asset object, and then add the address information of the target asset object to an asset receiving object that corresponds to the target asset object, to complete online transference of the asset object.

It can be seen from the previous implementation that, the target member in the blockchain network deploys, in the blockchain network, the smart contract object that corresponds to the asset type of the asset object, and therefore, the user who accesses the blockchain network can invoke, by initiating the asset object creation request and the asset object transfer request to the blockchain network, the smart contract object that has been deployed in the blockchain network, to complete creation of the asset object in the blockchain network; and can add the address information of the created asset object to the specific target object to hold the asset object, and complete transferring, in the blockchain network, the assets of the held asset object to another asset receiving object. As such, assets in the real world can be converted into digital assets in the blockchain network for holding and complete online asset transference relying on the blockchain network.

The present specification is described below by using specific implementations in combination with specific application scenarios.

Figure 1:
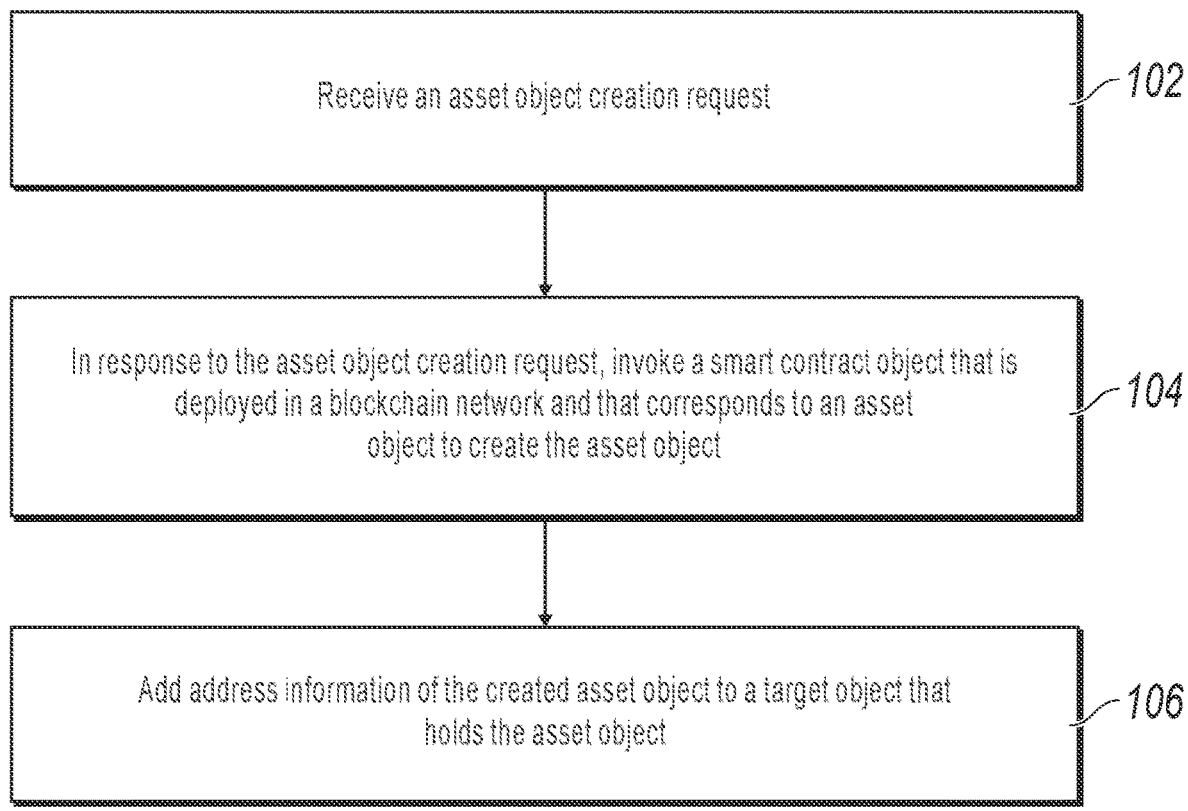
FIG. 1 is a flowchart illustrating an asset management method, according to an example implementation.

FIG. 1 shows an asset management method, according to an implementation of the present specification. The method is applied to a network node in a blockchain network, to perform the following steps:

Step 102: Receive an asset object creation request.

Step 104: In response to the asset object creation request, invoke a smart contract object that is deployed in the blockchain network and that corresponds to an asset type of an asset object to create the asset object.

Step 106: Add address information of the created asset object to a target object that holds the asset object.

Based on the same concept, the present specification further provides another asset management method.

Figure 2:
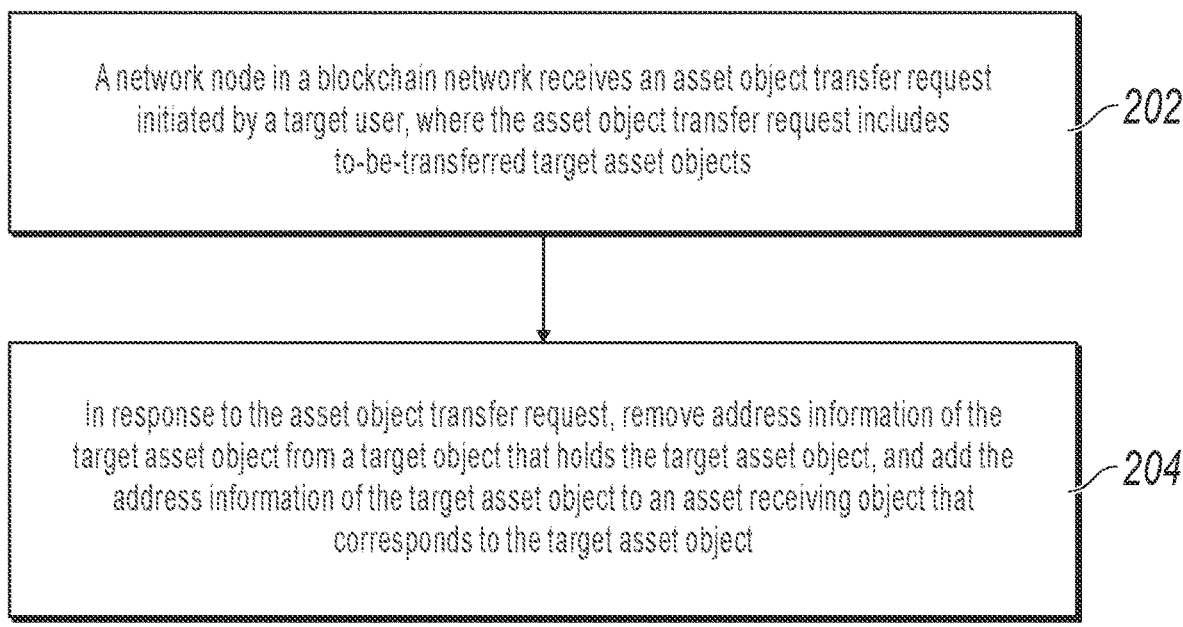
FIG. 2 is a flowchart illustrating another asset management method, according to an example implementation.

FIG. 2 shows an asset management method, according to an implementation of the present specification. The method is applied to a network node in a blockchain network, to perform the following steps:

Step 202: A network node in a blockchain network receives an asset object transfer request initiated by a target user, where the asset object transfer request includes to-be-transferred target asset objects.

Step 204: In response to the asset object transfer request, remove address information of the target asset object from a target object that holds the target asset object, and add the address information of the target asset object to an asset-receiving object that corresponds to the target asset object.

The blockchain network described in the present specification can include a blockchain network whose supported objects can include any type of asset object.

For example, in a conventional blockchain network, supported objects usually include an account object and a smart contract object. However, in the present specification, objects supported by the blockchain network can be extended, and an asset object is further supported through extension on the basis of the account object and the smart contract object that are currently supported by the blockchain network.

It is worthwhile to note that, a type of the blockchain network described in the present specification is not limited, and may be a consortium chain, or may be another type of blockchain network (such as a private chain or a public link) other than the consortium chain.

The smart contract object can include a smart contract program that is deployed by a target member of the blockchain network in the blockchain network, that is recorded in a distributed database (namely, a blockchain network ledger) of the blockchain network, and that is used to manage the asset object supported by the blockchain network. A user who accesses the blockchain network can create an asset object in the blockchain network and complete online management of the held asset object in the blockchain network by invoking the smart contract object.

For example, in an example, the blockchain network can be a consortium chain formed by several financial institutions that serve as consortium members. In this case, the target member in the blockchain network can be a financial institution that has asset object creation authority and that serves as the consortium member in the consortium chain. A distributed smart contract platform can be established by using the consortium chain. An operator of the smart contract platform can extend object types supported by the smart contract platform, and further add the asset object through extension on the basis of the account object and the smart contract object that are currently supported, so that the financial institution serving as the consortium member can create a new asset in the platform by deploying the smart contract (smart contract object) in the blockchain network and the user who accesses the blockchain network can create the asset object and complete the online management of the held asset object by invoking the smart contract.

It is worthwhile to note that, in the present specification, a type of a request in the blockchain network that is initiated by the user who accesses the blockchain network can refer to a transaction (transfer) used in the conventional blockchain network.

For example, the user who accesses the blockchain network can initiate, in the blockchain network, a transaction used to create the asset object, to invoke a smart contract object that has been deployed in the blockchain network to complete creation of the asset object; or the user who accesses the blockchain network can initiate, in the blockchain network, a transaction used to complete state update of the asset object, to invoke the smart contract object that has been deployed in the blockchain network to complete the asset state update of the asset object.

In some implementations, a type of a request in the blockchain network that is initiated by the user who accesses the blockchain network can be another form of an instruction, a message, or the like with a standard data structure other than the transaction. Implementations are not limited in the present specification. In the following implementations, an example in which the request in the blockchain network that is initiated by the user who accesses the blockchain network is the transaction is used for description.

The asset objects can include a smart asset object. The smart asset object is used to maintain a smart asset, the smart asset corresponds to any type of real asset of the user in the real world, and the smart asset can be applied to the blockchain network for processing by using the smart asset object. For example, the asset object is applicable to processing of the smart asset object in a method such as a smart contract in the blockchain network. The smart asset corresponds to a type of real asset of the user in the real world. Implementations are not limited in the present specification.

For example, the blockchain network is the consortium chain formed by several financial institutions. In actual applications, any form of offline asset of the user such as funds, real estate, stocks, loan contracts, bank bill, or accounts receivable can be packed into a digital asset by a financial institution managing a network node in the consortium chain, and can be created and deployed in a distributed database of the consortium chain.

The following describes in detail the technical solutions of the present specification by using specific implementations in combination with "blockchain network object extension", "smart contract object deployment", "asset object creation", and "asset object transference".

(1) Blockchain Network Object Extension

In the present specification, in response to establishing a blockchain network, an operator of the blockchain network can extend the objects supported by the blockchain network.

In the conventional blockchain network (for example, the Ethereum), the objects supported by the blockchain network generally include only two types: the account object and the smart contract object. However, in the present specification, the objects supported by the blockchain network can be extended, and the asset object is further added through extension on the basis of the existing account object and the existing smart contract object.

In other words, in the present specification, the objects supported by the blockchain network can include three types: the account object, the smart contract object, and the asset object. In this method, the user who accesses the blockchain network can create a digital asset in the blockchain network in addition to an account and the smart contract in the blockchain network, so that assets in the real world can be converted into the digital asset deployed in the blockchain network.

In a shown implementation, the object supported by the blockchain network can still be formed by the following four types of attribute fields:

Balance field (address field): In the conventional blockchain network (for example, the Ethereum), the balance field usually represents a "balance", and is used to indicate the number of tokens held by the object. However, in the present specification, the meaning of the balance field can be extended, and does not represent the "balance", but is used to maintain address information of the asset object held by the object. In actual applications, the balance field can be used to maintain address information of a plurality of asset objects.

During implementation, the account object, the smart contract object, and the asset object shown above can hold, by adding the address information of the asset object to the balance field, the asset object that corresponds to the address information. In other words, in the present specification, the asset object can also hold a virtual asset in addition to the account object and the smart contract object shown above.

Storage field: used to maintain various states (such as an account state, a smart contract state, and an asset state) of the object. For example, the asset object is used as an example, and a financial institution that deploys the asset object or another executor that is specified by the financial institution and that has the authority to update the asset object can update the state of the asset object by modifying content in the storage field. For example, the asset object is a digital asset obtained by packaging an offline loan contract asset of the user, and in response to a regular loan repayment state of the user changes, the financial institution that deploys the asset object or another executor that is specified by the financial institution and that has the authority to update the asset object can synchronously update, based on the change of the regular loan repayment state of the user, content in the storage field in the asset object that corresponds to the digital asset.

Code field: used to maintain execution code (for example, various executable methods related to the code) related to an execution program stated in an object. In other words, in the present specification, the account object, the smart contract object, and the asset object shown above can state related execution programs in the object.

For example, the smart contract object used to manage the asset object is used as an example, any form of operation related to the asset object managed by the smart contract object can be previously stated in the form of execution program in the code field of the smart contract object, and later, a corresponding operation can be completed by directly invoking these execution programs. For example, the execution programs stated in the smart contract object used to manage the asset object can usually include an execution program used to create an asset object, an execution program for updating an asset object, an execution program for transferring an asset object, etc.

It is worthwhile to note that, the code field can also maintain an invocation address of the smart contract object, an invocation parameter that is transferred when the smart contract object is invoked, etc. in addition to execution code related to the execution program stated in the object.

Nonce field: used to maintain a count of preventing replay attacks occurring in the blockchain network. Usually, the count can be a random number or a pseudorandom number that is used to prevent replay attacks occurring in the blockchain network.

(2) Smart Contract Object Deployment

In a shown implementation, the blockchain network can be a consortium chain formed by several financial institutions that serve as consortium members. In this case, the target member in the blockchain network can be a financial institution that has asset object creation authority and that serves as the consortium member in the consortium chain.

A distributed smart contract platform can be established by using the consortium chain. The financial institution that has the asset object creation authority in the consortium chain can create a new asset in the platform by deploying the smart contract (smart contract object) in the consortium chain.

During implementation, each financial institution in the consortium chain can be first registered as a consortium member of the consortium chain, and obtain a pair of a public key and a private key returned by the consortium chain. The public key serves as an account address of each financial institution in the consortium chain; and the private key is the only key for each financial institution to operate the account. Then, the operator of the consortium chain can jointly grant the asset object creation authority to each financial institution that joins the consortium chain. When the financial institution obtains the asset object creation authority, the financial institution can create and deploy the smart contract in the consortium chain based on actual needs to create a new asset.

A specific process in which the financial institution deploys the smart contract in the consortium chain is omitted in the present specification. A person skilled in the art can refer to records in related technologies.

For example, in actual applications, the financial institution can deploy the created smart contract to the consortium chain by deploying a transaction to the consortium chain based on a held private key. In response to receiving, by using the managed network node, the transaction that is deployed by another financial institution, each consortium member in the consortium chain can perform, based on a consensus algorithm of the consortium chain, consensus processing on the transaction deployed in the consortium chain in a recent period of time, and after completing consensus processing, each consortium member in the consortium chain records, in the distributed database of the consortium chain, the smart contract deployed in the transaction. The consensus algorithm supported by the consortium chain and a consensus processing procedure of the consortium chain based on the consensus algorithm are omitted in the present specification. A person skilled in the art can refer to records in related technologies.

In the present specification, an execution program related to the asset type that corresponds to the smart contract can be previously stated in the smart contract that is deployed by the financial institution in the consortium chain and that corresponds to the new asset. These previously stated execution programs can be included in the code field of the smart contract object that corresponds to the smart contract.

In a shown implementation, execution programs stated in the smart contract that is deployed by the financial institution in the consortium chain and that corresponds to the new asset can include an execution program used to create an asset object and an execution program used to transfer an asset object. By invoking an API interface provided by the consortium chain, the user who accesses the consortium chain can deploy, to the consortium chain, a transaction that is signed based on the held private key, and invoke the execution program stated in the smart contract, to create a virtual asset and complete online transference of the held virtual asset.

In some implementations, in addition to the described execution programs used to create and transfer asset objects, the execution program stated in the smart contract corresponding to the new asset type and deployed by the financial institution in the consortium blockchain network can further include other execution programs related to the asset object, for example, an execution program used to update an asset object. The execution programs are not listed one by one in the present specification.

(3) Asset Object Creation

In the present specification, a user who needs to access a blockchain network can be previously registered as a user in the consortium chain, and obtain a pair of a public key and a private key that are returned by the consortium chain. After the registration is completed, the consortium chain can create a corresponding account object for the user.

In addition, a registered user can deploy, to the consortium chain by using the API interface provided by the consortium chain, a transaction that is signed based on the held private key and that is used to request to create an asset object.

After receiving the transaction deployed by the user based on the private key, a network node in the consortium chain that corresponds to the registered user can first perform identity authentication on the user based on a public key that corresponds to the private key held by the user. For example, in actual applications, the user can sign the initiated transaction based on the held private key, and a network node in the blockchain network performs authentication on the signature based on the public key that corresponds to the private key held by the user. If the signature authentication succeeds, in this case, the identity authentication for the user succeeds.

After the identity authentication succeeds, based on the consensus algorithm, consensus processing can be performed on a transaction received within a period of time, and after consensus processing is completed, the transaction can be executed, to determine a type of an asset object (various smart contract objects that correspond to different types of asset objects can be deployed in the consortium chain, and the user can request to create a particular type of asset object) that is to be created at the request of the user.

For example, in an implementation, a type of the asset object that is to be created on request can be stated in the transaction deployed by the user based on the held private key, and the network node that receives the transaction can determine, based on information stated in the transaction, the type of the asset object that is to be created at the current request of the user.

After determining the type of the asset object that is to be created at the request of the user, the network node can further query a smart contract object that has been deployed in the consortium chain and that corresponds to the type of the asset object requested by the user, and then can invoke, based on an invocation address of the smart contract object, an execution program that is stated in the smart contract object and that is used to create the asset object, to complete the creation of the asset object.

For example, in an implementation, the transaction deployed by the user based on the held private key can further include parameters related to the asset object that is to be created on request, for example, the number of assets that are to be created on request. In response to invoking the smart contract object, the network node can use these parameters as invocation parameters to transmit these parameters to the execution program that is stated in the smart contract object and that is used to create the asset object, to execute invocation and complete the creation of the asset object.

In a shown implementation, after completing creating the asset object for the user through the process shown above, the network node can further add address information of the created asset object to the balance field of the target object that holds the asset object.

In the present specification, a process of generating the address information of the asset object is not limited in the present specification. For example, in an implementation, the address information of the asset object can be a hash value obtained by performing hash calculation on transaction content of the asset object that is to be created on request.

In a shown implementation, target objects that eventually hold the created asset object include the following two cases:

In one case, the target object that eventually holds the created asset object can be a target object that is specified by the user and that is used to hold the asset object.

For example, during implementation, the user can previously state, in the deployed transaction that requests to create the asset object, the target object that can hold the newly created asset object; or the user can notify, through offline notification, the specified target object that holds the created asset object to the financial institution that deploys the asset object.

In the other case, the target object that eventually holds the created asset object can be a target object that is previously stated in the smart contract object and that is used to hold the asset object. In other words, in response to deploying the smart contract object, the financial institution can previously state, in the smart contract object, a target object that can hold the asset object created by invoking the smart contract object.

For example, in response to deploying the smart contract object, the financial institution can previously state, in the smart contract object, a whitelist of target objects that can hold the asset object created by invoking the smart contract object. Only the target objects in the whitelist can hold the asset object created by invoking the smart contract object.

In a shown implementation, any one of the account object, the smart contract object, and the asset object supported by the consortium chain can eventually hold the created asset object. In other words, in the present specification, the account object, the smart contract object, and the asset object supported by the consortium chain can hold the asset object. The created asset object can be held by any one of the account object, the smart contract object, and the asset object that are specified by the user or stated in the smart contract object.

For example, in an example, the user can designate an asset object A as a target object that holds a created asset object B, and then can add address information of the asset object B to a balance field of the asset object A, to complete packing processing of the asset object A and the asset object B.

(4) Asset Object Transference

In the present specification, in actual applications, in addition to a method for deploying, to the consortium chain by using the API interface provided in the consortium chain, a transaction that is signed based on the held private key and that is used to request to create the asset object, to initiate the creation of the asset object, the registered user can also perform a method for deploying, to the consortium chain by using the API interface, a transaction that is signed based on the held private key and that is used to transfer the asset object.

In addition, after receiving the transaction deployed by the user based on the private key, the network node in the consortium chain that corresponds to the registered user can first perform identity authentication on the user based on a public key that corresponds to the private key held by the user. After the identity authentication succeeds, consensus processing can be performed, based on the consensus algorithm, on the transaction received within a period of time. After the consensus processing is completed, the transaction can be executed, to determine the target asset object that is to be transferred at the current request of the user.

For example, in an implementation, the address information of the asset object that is to be transferred on request or identification information of another type can be stated in the transaction deployed by the user based on the held private key, and the network node that receives the transaction can determine, based on information stated in the transaction, the target asset object that is to be transferred at the current request of the user. After determining the target asset object that is to be transferred at the request of the user, the network node can remove the address information of the target asset object from the balance field of the target object that holds the target asset object, and add the address information of the target asset object to the balance field in the asset receiving object that corresponds to the target asset object.

It is worthwhile to note that, in the present specification, the user can complete transference of the held asset object in the consortium chain through transaction initiation in the following two methods:

In a shown implementation, a transaction type used to transfer a virtual asset can be defined in the consortium chain, and the user can complete transference of the asset object in the consortium chain by initiating, in the consortium chain, the defined transaction type used to transfer a virtual asset without invoking the smart contract object. The network node that performs the type of transaction removes the address information of the target asset object from the balance field of the target object that holds the target asset object, and adds the address information of the target asset object to the balance field in the asset receiving object that corresponds to the target asset object.

In another shown implementation, transference of the asset object that is initiated by the user can be completed by invoking the smart contract object that corresponds to the asset type of the asset object. In this case, the execution program used to transfer the asset object can be previously stated in the smart contract object, and a transfer rule can be previously defined in the execution program.

The transfer rule can be some asset transference requirements stated in the smart contract object. A person skilled in the art can customize specific content of the asset transference requirements based on actual needs. For example, in an example, the asset transference requirements can be that the user who initiates the transaction can complete transference of the asset object when the user who initiates the transaction belongs to a specified user group stated in the smart contract object.

Execution logic that corresponds to the execution program used to transfer the asset object is not limited in the present specification, and can be customized by a person skilled in the art based on actual needs. For example, in some cases, the execution program can be execution code of asset transference requirements, etc. previously stated in the code field in the smart contract object.

In addition, when a user requests to transfer, in the consortium chain, an asset object created by invoking the smart contract, the user can initiate, in the consortium chain to the smart contract object, a transaction used to transfer the asset object, to serve as input of the smart contract object, and then invoke, based on the invocation address of the smart contract object that corresponds to the target asset object, an execution program that is stated in the smart contract object and that is used to transfer the asset object, to determine whether the transaction that is initiated by the user and that is used to transfer the asset object satisfies the transfer rule defined in the execution program. If the transaction satisfies the transfer rule, the network node can remove the address information of the target asset object from the balance field of the target object that holds the target asset object, and add the address information of the target asset object to the balance field in the asset receiving object that corresponds to the target asset object.

In a shown implementation, asset receiving objects that correspond to the target asset object can include the following two cases:

In one case, the asset receiving object that corresponds to the target asset object can be the asset receiving object that is specified by the user and that corresponds to the target asset object.

For example, during implementation, the user can previously state, in the deployed transaction that requests to transfer the asset object, the asset receiving object that corresponds to the target asset object; or the user can notify, through offline notification, the specified asset receiving object that corresponds to the target asset object to the financial institution that deploys the asset object.

In the other case, the asset receiving object that corresponds to the target asset object can also be the asset receiving object that is previously stated in the smart contract object and that corresponds to the target asset object. In other words, in response to deploying the smart contract object, the financial institution can previously state, in the smart contract object, the recipient object that can hold the asset object when transferring assets of the asset object created by invoking the smart contract object.

In a shown implementation, the asset-receiving object that corresponds to the target asset object can include any one of the account object, the smart contract object, and the asset object supported by the consortium chain. In other words, in the present specification, the target asset object that is to be transferred can be transferred to any one of the account object, the smart contract object, and the asset object supported by the consortium chain for holding.

It is worthwhile to note that, in some cases, usually, a list of users having invocation authority for the smart contract object can be further previously stated in the smart contract object. Therefore, in this case, after receiving the transaction deployed by the user based on the private key, in a phase of performing identity authentication on the user, the network node of the blockchain network can further perform authentication to determine whether the user has the invocation authority for the smart contract object. If authentication succeeds, it is determined that the user has the invocation authority for the smart contract object, and then the execution program that is stated in the smart contract object and that is used to create the asset object or transfer the asset object is invoked, to complete the creation and the transference of the asset object.

For example, the list that is stated in the smart contract object and that includes users having invocation authority for the smart contract object can be a list of public keys held by the user. After receiving the transaction deployed by the user based on the private key, the network node of the blockchain network can perform identity authentication on the user based on the public key in the list of public keys. If authentication succeeds, it indicates that the user is the user having the invocation authority for the smart contract object.

In some implementations, in actual applications, in addition to the previously shown method for performing identity authentication on the user based on the public key held by the user, specific methods for verifying whether the user submitting the transaction has the invocation authority for the smart contract object can include other methods. The specific methods are not listed one by one in the present specification.

It can be seen from the previous implementations that, in the present specification, the user who accesses the blockchain network can invoke, by initiating the asset object creation request and the asset object transfer request to the blockchain network, the smart contract object that has been deployed in the blockchain network, to complete creation of the asset object in the blockchain network; and can add the address information of the created asset object to the specific target object to hold the asset object, and complete transferring, in the blockchain network, the assets of the held asset object to another asset receiving object. As such, assets in the real world can be converted into digital assets in the blockchain network for holding and complete online asset transference relying on the blockchain network.

Figure 3:
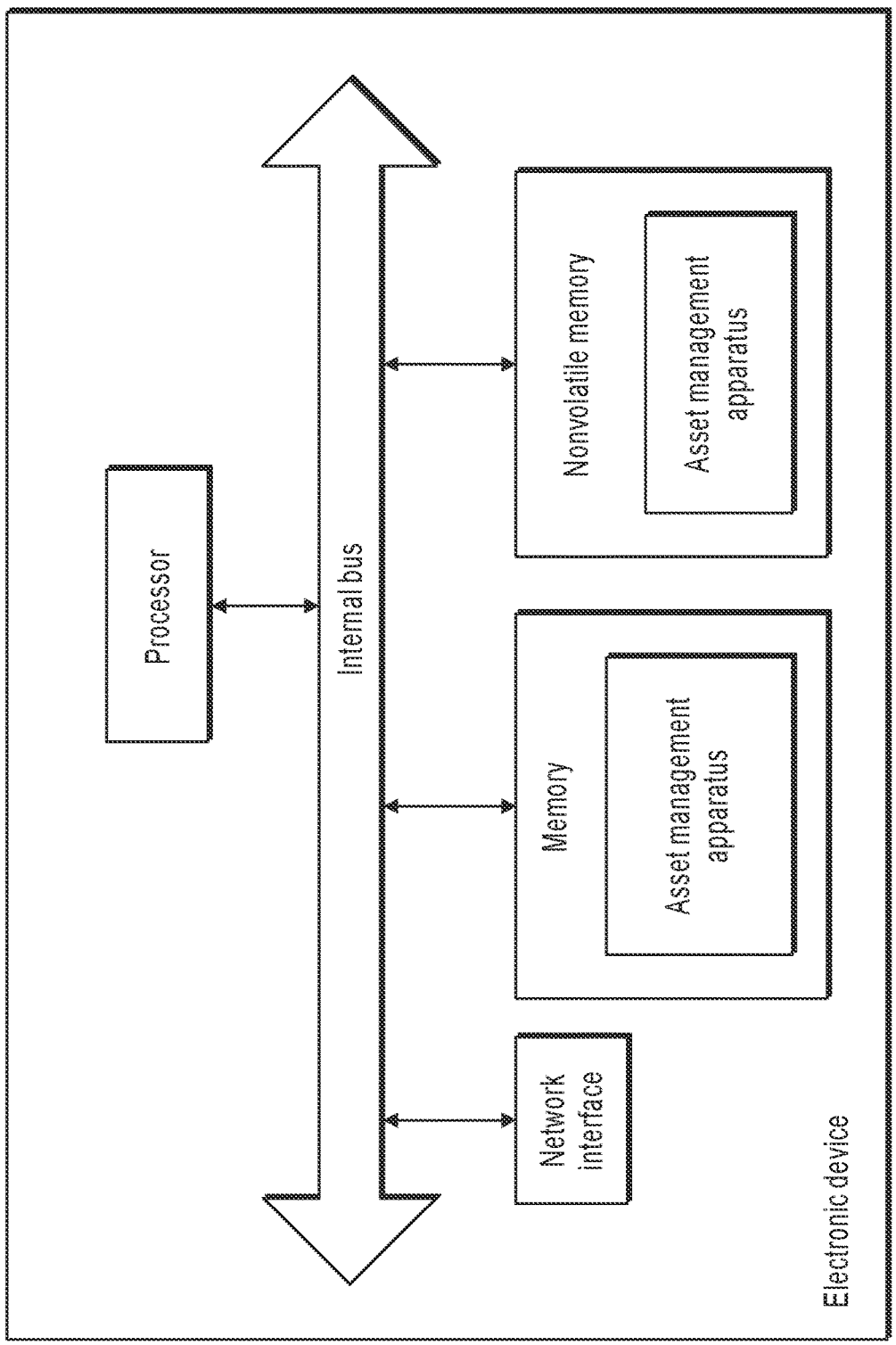
FIG. 3 is a schematic structural diagram illustrating an electronic device, according to an example implementation.

Corresponding to the described method implementation, the present specification further provides implementations of an asset management apparatus. The implementations of the asset management apparatus in the present specification can be applied to an electronic device. The apparatus implementations can be implemented by software, hardware, or a combination of hardware and software. Software implementation is used as an example. As a logic apparatus, the apparatus is formed by reading a corresponding computer program instruction in a nonvolatile memory to a memory by a processor of the electronic device that the apparatus is located in. In terms of hardware, FIG. 3 is a structural diagram illustrating hardware of an electronic device that the asset management apparatus of the present specification is located in. In addition to a processor, a memory, a network interface, and a nonvolatile memory shown in FIG. 3, the electronic device that the apparatus in the implementation is located in usually can include other hardware based on an actual function of the electronic device. Details are omitted here for simplicity.

Figure 4:
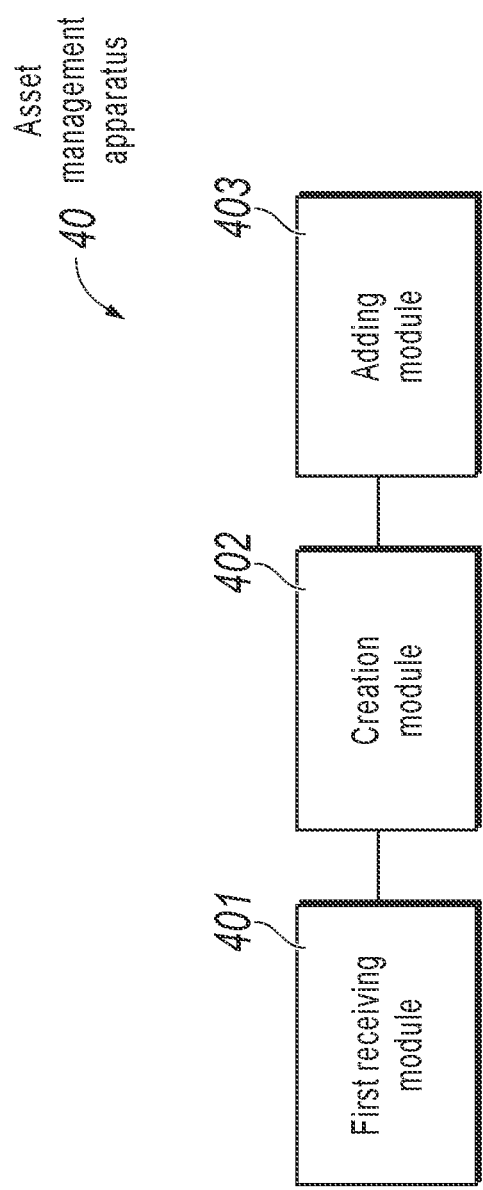
FIG. 4 is a block diagram illustrating an asset management apparatus, according to an example implementation.

FIG. 4 is a block diagram illustrating an asset management apparatus, according to an example implementation of the present specification.

Referring to FIG. 4, an asset management apparatus 40 may be applied to the electronic device shown in FIG. 3, and the asset management apparatus 40 includes a first receiving module 401, a creation module 402, and an adding module 403.

The first receiving module 401 is configured to receive an asset object creation request.

The creation module 402 is configured to: in response to the asset object creation request, invoke a smart contract object that is deployed in a blockchain network and that corresponds to an asset type of an asset object to create the asset object.

The adding module 403 is configured to add address information of the created asset object to a target object that holds the asset object.

In the present implementation, an execution program used to create the asset object is stated in the smart contract object; and the creation module 402 is configured to: invoke an execution program stated in a smart contract object that is deployed by a target member of the blockchain network in the blockchain network and that corresponds to the asset type of the asset object to create the asset object.

In the present implementation, an object supported by the blockchain network includes an address field, and the address field is used to maintain address information of an asset object held by the object.

In the present implementation, the adding module 403 is further configured to: add the address information of the created asset object to the address field of the target object that holds the asset object.

In the present implementation, an object supported by the blockchain network further includes a code field, and the code field is used to maintain execution code related to an execution program stated in the object.

In the present implementation, the target object that holds the asset object includes: a target object that is specified by a user and that is used to hold the asset object; or a target object that is stated in the smart contract object and that is used to hold the asset object.

In the present implementation, objects supported by the blockchain network include an account object, a smart contract object, and an asset object; and the target object that holds the asset object includes any one of the account object, the smart contract object, and the asset object.

Figure 5:
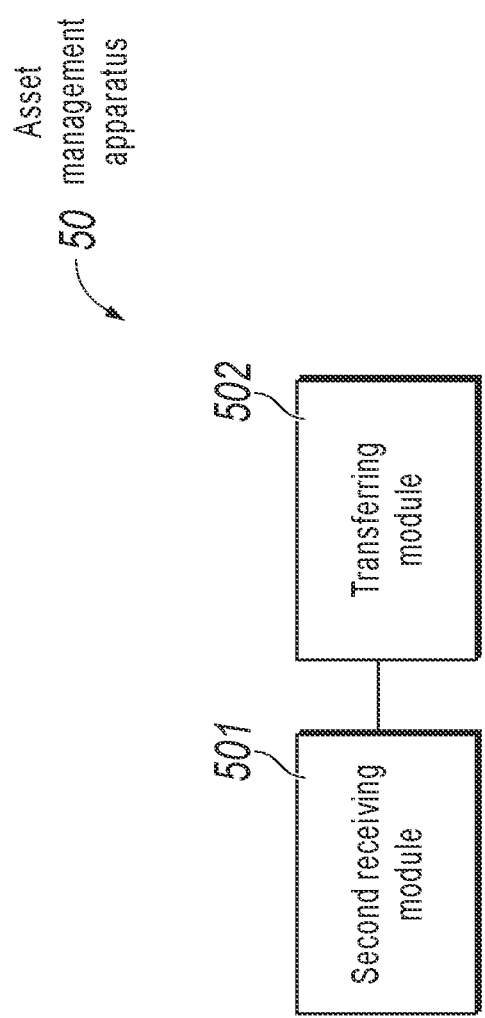
FIG. 5 is a block diagram illustrating another asset management apparatus, according to an example implementation.

FIG. 5 is a block diagram illustrating another asset management apparatus, according to an example implementation of the present specification.

Referring to FIG. 5, an asset management apparatus 50 may also be applied to the electronic device shown in FIG. 3, and the asset management apparatus 50 includes a second receiving module 501 and a transferring module 502.

The second receiving module 501 is configured to receive an asset object transfer request initiated by a target user, where the asset object transfer request includes to-be-transferred target asset objects.

The transferring module 502 is configured to: in response to the asset object transfer request, remove address information of the target asset object from a target object that holds the target asset object, and add the address information of the target asset object to an asset receiving object that corresponds to the target asset object.

In the present implementation, a smart contract object that corresponds to an asset type of the target asset object is deployed in the blockchain network, an execution program used to transfer an asset object is stated in the smart contract object, and the target asset object is created by invoking the smart contract object; and the transferring module 502 is further configured to: invoke the execution program stated in the smart contract object that is deployed in the blockchain network and that corresponds to the asset type of the target asset object, and determine whether an asset transferring request satisfies a predetermined transfer rule; and if the asset transferring request satisfies the predetermined transfer rule, remove the address information of the target asset object from the target object that holds the target asset object, and add the address information of the target asset object to the asset receiving object that corresponds to the target asset object.

In the present implementation, an object supported by the blockchain network includes an address field, and the address field is used to maintain address information of an asset object held by the object.

In the present implementation, the transferring module is further configured to: remove the address information of the target asset object from the address field in the target object that holds the target asset object, and add the address information of the target asset object to the address field in the asset receiving object that corresponds to the target asset object.

In the present implementation, an object supported by the blockchain network further includes a code field, and the code field is used to maintain execution code related to an execution program stated in the object.

In the present implementation, the asset receiving object that corresponds to the target asset object includes: an asset receiving object that is specified by a user and that corresponds to the target asset object; or an asset receiving object that is stated in the smart contract object corresponding to the asset type of the target asset object and that corresponds to the target asset object.

In the present implementation, objects supported by the blockchain network include an account object, a smart contract object, and an asset object; and the asset receiving object that corresponds to the target asset object includes any one of the account object, the smart contract object, and the asset object.

For an implementation process of functions and roles of each module in the apparatus, references can be made to an implementation process of a corresponding step in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions in the present specification. A person of ordinary skill in the art can understand and implement the implementations of the present specification without creative efforts.

The system, apparatus, module, or unit illustrated in the previous implementations can be implemented by using a computer chip or an entity, or can be implemented by using a product having a particular function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the described method implementation, the present specification further provides an implementation of an electronic device. The electronic device includes a processor and a memory configured to store a machine-executable instruction, where the processor and the memory are generally connected to each other by using an internal bus. In another possible implementation, the device may further include an external interface, to communicate with another device or component.

In the present implementation, by reading and executing the machine-executable instruction that is stored in the memory and that corresponds to control logic of asset management, the processor is enabled to: receive an asset object creation request; in response to the asset object creation request, invoke a smart contract object that is deployed in the blockchain network and that corresponds to an asset type of an asset object to create the asset object; and add address information of the created asset object to a target object that holds the asset object.

In the present implementation, an execution program used to create the asset object is stated in the smart contract object; and by reading and executing the machine-executable instruction that is stored in the memory and that corresponds to control logic of asset management, the processor is further enabled to: invoke an execution program stated in a smart contract object that is deployed by a target member of the blockchain network in the blockchain network and that corresponds to the asset type of the asset object to create the asset object.

In the present implementation, an object supported by the blockchain network includes an address field, and the address field is used to maintain address information of an asset object held by the object; and by reading and executing the machine-executable instruction that is stored in the memory and that corresponds to control logic of asset management, the processor is further enabled to: add the address information of the created asset object to the address field of the target object that holds the asset object.

Corresponding to the described method implementation, the present specification further provides an implementation of another electronic device. The electronic device includes a processor and a memory configured to store a machine-executable instruction, where the processor and the memory are generally connected to each other by using an internal bus. In another possible implementation, the device may further include an external interface, to communicate with another device or component.

In the present implementation, by reading and executing the machine-executable instruction that is stored in the memory and that corresponds to control logic of asset management, the processor is enabled to: receive an asset object transfer request initiated by a target user, where the asset object transfer request includes to-be-transferred target asset objects; and in response to the asset object transfer request, remove address information of the target asset object from a target object that holds the target asset object, and add the address information of the target asset object to an asset receiving object that corresponds to the target asset object.

In the present implementation, a smart contract object that corresponds to an asset type of the target asset object is deployed in the blockchain network, an execution program used to transfer an asset object is stated in the smart contract object, and the target asset object is created by invoking the smart contract object; and by reading and executing the machine-executable instruction that is stored in the memory and that corresponds to control logic of asset management, the processor is further enabled to: invoke the execution program stated in the smart contract object that is deployed in the blockchain network and that corresponds to the asset type of the target asset object, and determine whether an asset transferring request satisfies a predetermined transfer rule; and if the asset transferring request satisfies the predetermined transfer rule, remove the address information of the target asset object from the target object that holds the target asset object, and add the address information of the target asset object to the asset receiving object that corresponds to the target asset object.

In the present implementation, by reading and executing the machine-executable instruction that is stored in the memory and that corresponds to control logic of asset management, the processor is further enabled to: remove the address information of the target asset object from the address field in the target object that holds the target asset object, and add the address information of the target asset object to the address field in the asset receiving object that corresponds to the target asset object.

A person skilled in the art can easily figure out another implementation of the present specification after thinking over the specification and practicing the present disclosure here. The present specification is intended to cover any variations, uses, or adaptations of the present specification, and these variations, uses, or adaptations follow the general principles of the present specification and include common knowledge or conventional techniques that are not disclosed in the existing technology of the present specification. The specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The described descriptions are merely examples of implementations of the present specification, but are not intended to limit the present specification. Any modification, equivalent replacement, or improvement made without departing from the spirit and principle of the present specification shall fall within the protection scope of the present specification.

Figure 6:
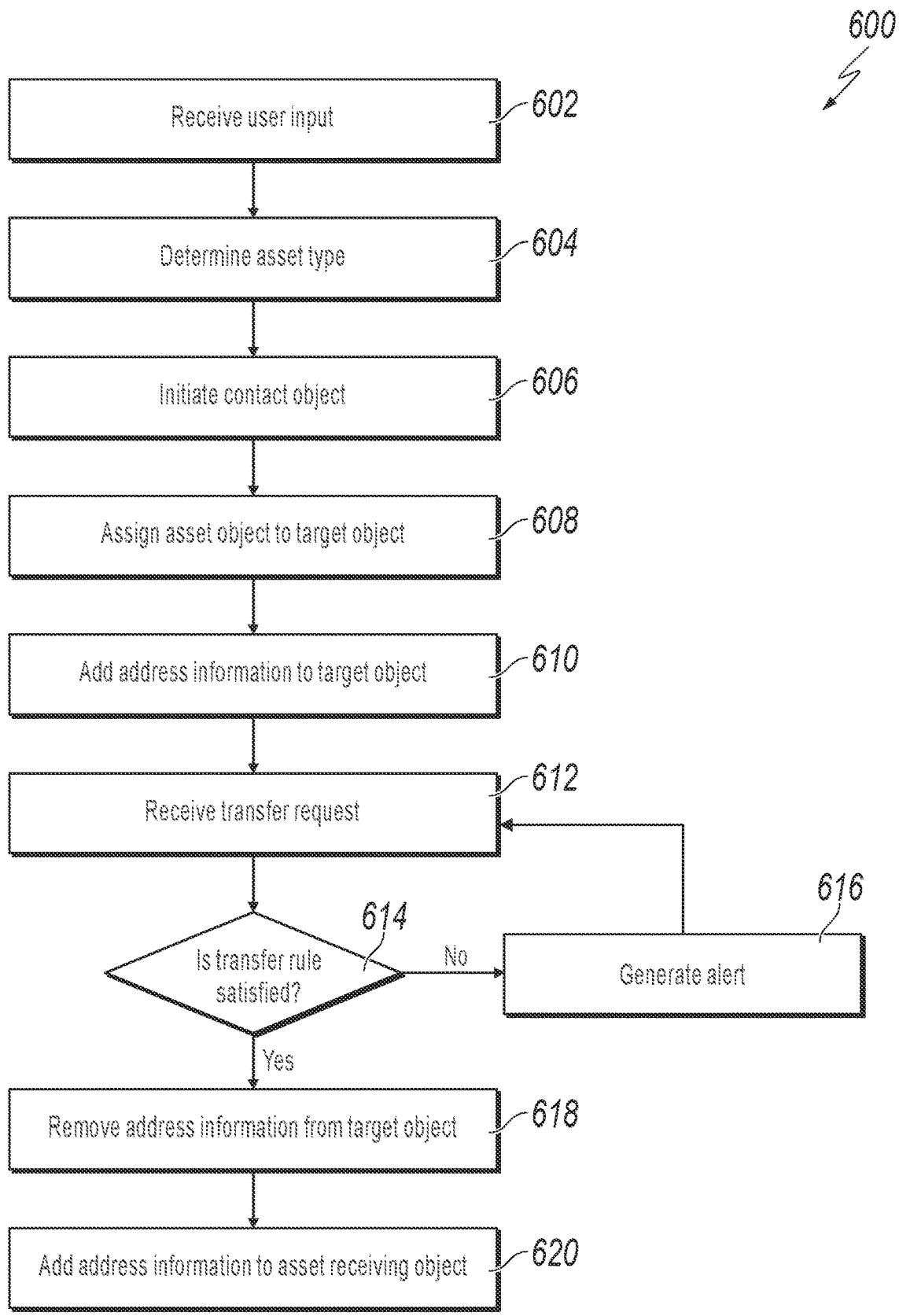
FIG. 6 is a flowchart illustrating an example of a computer-implemented method for asset management, according to an implementation of the present disclosure.

FIG. 6 is a flowchart illustrating an example of a computer-implemented method 600 for management of assets in a blockchain, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a user input is received from a target user recorded in a distributed database of the blockchain network. The user input includes a request to generate an asset object in the blockchain network. In some implementations, the blockchain network includes a consortium chain, and the target member (user) in the blockchain network is a consortium member that has asset object generation authority in the consortium chain. The blockchain network includes one or more account objects and one or more contract objects. The objects of the blockchain network (e.g., account objects, contract objects, target objects, and asset objects) include one or more fields. For example, the fields can include one or more of the following: the IP configuration for the target user; DNS logs from the target user, including events such as DNS lookups, changes to DNS settings, and so forth; network firewall logs (and/or other security-related log files) from the target user, including events such as blocked or allowed network communications, and so forth; operating system (OS) logs from the target user, including events associated with the OS; port settings on the target user; user access logs from the target user, including successful and/or unsuccessful user attempts to transfer assets from or to the target user; and/or user privilege data from the target user, including particular access privileges for various users on the target user. The fields can also include one or more of an entity name, entity ID, target user ID, OS version information, and software version(s) for installed software, network router information, other DNS settings, firewall settings, port settings, IP whitelist and/or blacklist settings, and so forth. The contract object includes an execution program configured to generate the asset object. The contract object can include a code field that is used to maintain an execution code related to the execution program. From 602, method 600 proceeds to 604.

At 604, an asset type of the asset object is determined based on the user input. From 604, method 600 proceeds to 606.

At 606, the contract object is initiated in the blockchain network to generate the asset object based on the asset type. The asset object includes a digital asset corresponding to a physical asset associated with the target user. From 606, method 600 proceeds to 608.

At 608, the asset object is assigned to a target object of the target user. The target object includes an address field used to maintain address information of the asset object assigned to the target object. From 608, method 600 proceeds to 610.

At 610, the address information of the asset object is added to the target object. From 610, method 600 proceeds to 612.

At 612, an asset transfer request is received from the target user, associated to the asset object. From 612, method 600 proceeds to 614.

At 614, a determination is made as to whether the asset transfer request satisfies a predetermined transfer rule. The predetermined transfer rule can include one or more parameters configured to protect the security and confidentiality of the target user and other users of the blockchain. For example, the transfer rule can include asset transference requirements defined by the contract object. The asset transference requirements can define parameters associated with the asset for transaction and the users that perform or are the recipients of the transaction. In some implementations, the user parameters can identify user groups associated with the objects of the blockchain. If it is determined that the asset transfer request does not satisfy the predetermined transfer rule, method 600 proceeds to 616. At 616, an alert is generated to indicate that the asset transfer request does not satisfy the predetermined transfer rule. From 616, method 600 returns to 612.

Otherwise, at 618, if it is determined that the asset transfer request satisfies the predetermined transfer rule, the address information of the asset object is deleted from the target object (e.g., a field of the target object) that holds the asset object. From 618, method 600 proceeds to 620.

At 620, the address information of the target object is added to an asset-receiving object that corresponds to the asset object. The asset-receiving object can be identified by the contract object based on the asset type of the asset object and can be associated to the target object (e.g., both asset-receiving object and target object belonging to a particular group of objects). After 620, method 600 stops.

Implementations of the present application can solve technical problems in managing assets in a blockchain. In some implementations, the blockchain is a distributed storage solution that provides immutable and tamper-resistant data transfer and storage, and the data is stored in a database of the blockchain in an encrypted form. Such security measures ensure that system state data stored on the blockchain is not corrupted or altered by malicious processes. For example, an alteration of an asset receiving object can be a tactic used by an attacker when a target user is compromised for fraudulent purposes, and storage of system state data on an immutable blockchain prevents the use of that tactic by an attacker. In some implementations, the blockchain headers from different payment applications across entities are cross-Merkelized or otherwise processed on the blockchain to further ensure the integrity of the data stored in the database of the blockchain.

In consideration of security and confidentiality, contract objects can be configured to perform privacy protection processing on the data associated with the asset object before generating the asset object and sending the address information to other platforms for processing. In addition, the asset transfer operation is configured such that it does not affect the overall data volume within the blockchain by deleting a data volume from a first location when adding the corresponding data volume in a second location. As such, the asset transfer operation does not lead to an exponential increase of data volume, which is a common problem associated with conventional methods of asset management.

Implementations of the present application provide methods and apparatuses for improving asset management. In some implementations, a processing platform (e.g., an payment processing server) obtains data that is to be validated and that corresponds to a predetermined feature from a data providing platform as a data group that is to be validated (e.g., a data group that corresponds to user transaction amounts). In addition, the processing platform can further obtain additional (e.g., historical) data associated with the asset that is to be validated by the predetermined transfer rule. The historical data may also corresponds to the same predetermined feature, and the comparison data group can be provided to a processing platform (e.g., a node of the blockchain network) for processing before the asset transfer. Then, the processing platform determines whether the asset transfer request satisfies the predetermined transfer rule. If the predetermined transfer rule is satisfied (e.g., there is no abnormal data), the processing platform can continue to transfer the asset. If the processing platform determines that there is abnormal data, the processing platform can start alerting, instruct related persons to analyze the cause of the data exception, and trigger related solutions.

In some implementations, the processing platform determines risk scores of asset transfers and transactions across multiple different entities, based on both transaction data for the transaction and system state data for the hosts involved in handling the transaction. The risk scores are examined to identify those transactions that are deemed high risk, with above-threshold scores. Such transactions can be blocked or queued for further examination in a case management system, for example. The system state data to be used for comparison, as well as the transaction data and risk score(s), can be stored on the blockchain that provides immutable, secure, and distributed data storage. Use of the blockchain facilitates the collection and analysis of a large amount of transaction data and system state data, which may grow over time as transaction traffic increases and/or transaction networks expand by adding more hosts to accommodate the increased traffic. Accordingly, through the use of a blockchain to store and analyze the data, implementations provide scalability with respect to the data extraction, analysis, and storage of the data. Moreover, because the blockchain is distributed across multiple network locations, implementations avoid the use of a centralized database for data storage and are therefore less vulnerable to corruption or deletion by malicious processes, in comparison to traditional, previously available risk analysis solutions that are vulnerable to attack at such a centralized storage hub.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include nonvolatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for asset management, the computer-implemented method comprising:
   receiving, from a target user accessing a distributed database of a blockchain network, a user input comprising a request to generate an asset object in the blockchain network, the blockchain network comprising an account object and a contract object, wherein the contract object comprises a code field used to maintain an execution code related to an execution program stated in the contract object, an invocation address of the contract object, and an invocation parameter that is transferred when the contract object is invoked;
   determining, based on the user input, an asset type of the asset object;
   initiating, in the blockchain network, by using the invocation address of the contract object, the execution code of the contract object to generate the asset object based on the asset type, the asset object comprising a digital asset corresponding to a physical asset associated with the target user;
   receiving, from the target user, an asset transfer request associated with the asset object, the asset transfer request comprising the invocation parameter;
   retrieving historical data of the target user associated with a feature of the asset object, wherein the historical data of the target user comprises at least one of a domain name system (DNS) feature identifying an event comprising an attempt of the target user to access the blockchain network, the event implying changes to DNS settings that is indicative of a past behavior associated with fraudulent purposes and the historical data is associated with past blocked or past allowed network communications;
   determining based on processing the historical data of the target user that abnormal data is absent from the historical data of the target user, wherein the abnormal data comprises parameters that are different from user parameters and asset parameters defined by a predetermined transfer rule;
   identifying an asset-receiving object that corresponds to the asset object based on the contract object and the asset type of the asset object; and
   deleting address information of the asset object from a target object and adding the address information of the asset object to the asset-receiving object that corresponds to the asset object.

2. The computer-implemented method of claim 1, wherein the contract object comprises the execution program configured to generate the asset object.

3. The computer-implemented method of claim 1, wherein the target object comprises an address field used to maintain the address information of the asset object assigned to the target object.

4. The computer-implemented method of claim 1, wherein the blockchain network comprises a consortium chain, and the target user in the blockchain network is a consortium member that has asset object generation authority in the consortium chain.

5. The computer-implemented method of claim 1, further comprising:
   determining whether the asset transfer request satisfies the predetermined transfer rule; and
   in response to determining that the asset transfer request satisfies the predetermined transfer rule, deleting the address information from the target object and adding the address information to the asset-receiving object that corresponds to the asset object.

6. The computer-implemented method of claim 5, wherein the asset-receiving object is identified by the contract object based on the asset type of the asset object and corresponds to the asset object.

7. A non-transitory, computer-readable medium storing one or more instructions executable by a computer system to perform operations comprising:
   receiving, from a target user accessing a distributed database of a blockchain network, a user input comprising a request to generate an asset object in the blockchain network, the blockchain network comprising an account object and a contract object, wherein the contract object comprises a code field used to maintain an execution code related to an execution program stated in the contract object, an invocation address of the contract object, and an invocation parameter that is transferred when the contract object is invoked;
   determining, based on the user input, an asset type of the asset object;

initiating, in the blockchain network, by using the invocation address of the contract object, the execution code of the contract object to generate the asset object based on the asset type, the asset object comprising a digital asset corresponding to a physical asset associated with the target user;

receiving, from the target user, an asset transfer request associated with the asset object, the asset transfer request comprising the invocation parameter;

retrieving historical data of the target user associated with a feature of the asset object, wherein the historical data of the target user comprises at least one of a domain name system (DNS) feature identifying an event comprising an attempt of the target user to access the blockchain network, the event implying changes to DNS settings that is indicative of a past behavior associated with fraudulent purposes and the historical data is associated with past blocked or past allowed network communications;

determining based on processing the historical data of the target user that abnormal data is absent from the historical data of the target user, wherein the abnormal data comprises parameters that are different from user parameters and asset parameters defined by a predetermined transfer rule;

identifying an asset-receiving object that corresponds to the asset object based on the contract object and the asset type of the asset object; and deleting address information of the asset object from a target object and adding the address information of the asset object to the asset-receiving object that corresponds to the asset object.

8. The non-transitory, computer-readable medium of claim 7, wherein the contract object comprises the execution program configured to generate the asset object.

9. The non-transitory, computer-readable medium of claim 7, wherein the target object comprises an address field used to maintain the address information of the asset object assigned to the target object.

10. The non-transitory, computer-readable medium of claim 7, wherein the blockchain network comprises a consortium chain, and the target user in the blockchain network is a consortium member that has asset object generation authority in the consortium chain.

11. The non-transitory, computer-readable medium of claim 7, wherein the operations further comprise: determining whether the asset transfer request satisfies a predetermined transfer rule; and in response to determining that the asset transfer request satisfies the predetermined transfer rule, deleting the address information from the target object and adding the address information to the asset receiving object that corresponds to the asset object.

12. The non-transitory, computer-readable medium of claim 11, wherein the asset-receiving object is identified by the contract object based on the asset type of the asset object and corresponds to the asset object.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  receiving, from a target user accessing a distributed database of a blockchain network, a user input comprising a request to generate an asset object in the blockchain network, the blockchain network comprising an account object and a contract object, wherein the contract object comprises a code field used to maintain an execution code related to an execution program stated in the contract object, an invocation address of the contract object, and an invocation parameter that is transferred when the contract object is invoked;
  determining, based on the user input, an asset type of the asset object;
  initiating, in the blockchain network, by using the invocation address of the contract object, the execution code of the contract object to generate the asset object based on the asset type, the asset object comprising a digital asset corresponding to a physical asset associated with the target user;
  receiving, from the target user, an asset transfer request associated with the asset object, the asset transfer request comprising the invocation parameter;
  retrieving historical data of the target user associated with a feature of the asset object, wherein the historical data of the target user comprises at least one of a domain name system (DNS) feature identifying an event comprising an attempt of the target user to access the blockchain network, the event implying changes to DNS settings that is indicative of a past behavior associated with fraudulent purposes and the historical data is associated with past blocked or past allowed network communications;
  determining based on processing the historical data of the target user that abnormal data is absent from the historical data of the target user, wherein the abnormal data comprises parameters that are different from user parameters and asset parameters defined by a predetermined transfer rule;
  identifying an asset-receiving object that corresponds to the asset object based on the contract object and the asset type of the asset object; and
  deleting address information of the asset object from a target object and adding the address information of the asset object to the asset-receiving object that corresponds to the asset object.

14. The computer-implemented system of claim 13, wherein the contract object comprises the execution program configured to generate the asset object.

15. The computer-implemented system of claim 13, wherein the target object comprises an address field used to maintain the address information of the asset object assigned to the target object.

16. The computer-implemented system of claim 13, wherein the blockchain network comprises a consortium chain, and the target user in the blockchain network is a consortium member that has asset object generation authority in the consortium chain.

17. The computer-implemented system of claim 13, further comprising: determining whether the asset transfer request satisfies the predetermined transfer rule; and
  in response to determining that the asset transfer request satisfies the predetermined transfer rule, deleting the address information from the target object and adding the address information to the asset-receiving object that corresponds to the asset object, wherein the asset-receiving object is identified by the contract object based on the asset type of the asset object and corresponds to the asset object.

* * * * *

UNITED STATES PATENT AND TRADEMARK OFFICE
CERTIFICATE OF CORRECTION

PATENT NO. : 11,468,048 B2  
APPLICATION NO. : 17/355009  
DATED : October 11, 2022  
INVENTOR(S) : Xuebing Yan Page 1 of 1

It is certified that error appears in the above-identified patent and that said Letters Patent is hereby corrected as shown below:

On the Title Page

In Column 2, Item [56], Line 2, delete "99.", therefor.

In the Claims

In Column 25, Line 47, Claim 11, delete "a" and insert -- the --, therefor.

In Column 25, Line 51, Claim 11, delete "asset receiving" and insert -- asset-receiving --, therefor.

Signed and Sealed this  
Twenty-second Day of November, 2022

Katherine Kelly Vidal  
*Director of the United States Patent and Trademark Office*